United States Patent [19]

Newberg

[11] Patent Number: 5,035,043

[45] Date of Patent: Jul. 30, 1991

[54] METHOD OF ASSEMBLY OF BEARING SUPPORT STRUCTURE TO THE STATOR ASSEMBLY OF AN ELECTRIC MOTOR

[75] Inventor: Barry M. Newberg, St. Louis, Mo.

[73] Assignee: Emerson Electric Co., St. Louis, Mo.

[21] Appl. No.: 568,028

[22] Filed: Aug. 16, 1990

Related U.S. Application Data

[62] Division of Ser. No. 07/380,146, Jul. 14, 1989, Pat. No. 4,972,113.

[51] Int. Cl.$^5$ .................... H02K 15/16; B23P 19/04
[52] U.S. Cl. ......................................... 29/596; 29/521; 29/898.07; 29/DIG. 37
[58] Field of Search .................. 29/437, 521, 559, 596, 29/609, 732, 738, 898.07, 598, DIG. 37; 310/42, 62, 85, 89, 90, 91, 217, 254, 258, 259

[56] References Cited

U.S. PATENT DOCUMENTS

| | | | |
|---|---|---|---|
| 4,361,953 | 12/1982 | Peachee | 29/596 |
| 4,380,713 | 4/1983 | Roger et al. | 29/596 X |
| 4,480,378 | 11/1984 | White et al. | 29/596 |
| 4,521,953 | 6/1985 | King et al. | 29/596 |
| 4,538,345 | 9/1985 | Diederichs | 29/596 |

Primary Examiner—Joseph M. Gorski
Assistant Examiner—Peter Dungba Vo
Attorney, Agent, or Firm—Polster, Polster and Lucchesi

[57] ABSTRACT

An electric motor structure and method of assembling the same wherein such structure includes a laminated stator core with a rotor body disposed therein with a rotor shaft extending therefrom to be supported by bearing support end shield means having bearing supports tightly fastened to said stator core in a manner that resistance to bending forces is less in the laminated stator core than the resistances to bending forces of the bearing support end shield means to enhance stability and squareness of the bearing support end shield means and bearing supports of the motor assembly.

7 Claims, 3 Drawing Sheets

METHOD OF ASSEMBLY OF BEARING SUPPORT STRUCTURE TO THE STATOR ASSEMBLY OF AN ELECTRIC MOTOR

This is a divisional of copending application Ser. No. No. 07/380,146, filed on 07/14/89, now U.S. Pat. No. 4,972,113.

BACKGROUND OF THE INVENTION

This invention relates to an improved electric motor structure and method of assembling the same and more particularly to an improved structure and method for securing a bearing support end shield to the stator assembly of an electric motor, for example, a fractional horsepower electric motor.

An electric motor, such as a fractional horsepower motor known in the art, generally includes a stator assembly of a stack of laminations (preferably made of sheets of suitable steel or other ferro-magnetic material) punched or stamped with a central bore and a plurality of winding receiving slots extending generally radially outwardly from the bore. The laminations are stacked to form a stator core and secured together in one or more of several ways including welding, epoxy adhesive and fastener cleats. A rotor assembly including a rotor body and an axial shaft extending therefrom is centered in the central bore of the stator core with a uniform air gap therebetween with the rotor shaft extending centrally from the rotor body end. Bearing support end shield means is secured to the stator assembly so that the rotor shaft is rotatably journalled in the bearing support to rotatably support the rotor body within the stator core assembly.

A number of assembly structures for securing the bearing support end shield means to the stator assembly have been employed in the art. The more recently issued U.S. Pat. Nos. 4,306,168 and No. 4,361,953 to C. Theodore Peachee on Dec. 15, 1981 and Dec. 7, 1982, respectively teach a novel apparatus and method for securing bearing support end shields to the stator assembly of an electric motor by utilizing self-tapping screws and removable shims during assembly operations.

The present invention, recognizing the advantageous features taught by these aforementioned patents, as well as certain of the limitations, provides an improved apparatus and method for securing bearing support end shield means to the stator core assembly of an electric motor which utilizes such past advantageous features combined with unique and novel additional structural features and method steps, which new structure and steps are low in cost in manufacture and assembly and which further enhance structural stability and balanced support of an assembled electric motor without special parts or expensive, complex processing steps and without jeopardizing the overall strength of the electric motor. In accordance with the present invention, a novel electric motor is provided which not only is economical in manufacture and assembly, but which is sturdy and stable with enhanced squareness and balance necessary for the rotor shaft ball bearings when operated under high loads and/or high speeds so as to extend motor life. This enhanced squareness is obtained in an economical and straightforward structure and method substantially less complex than past arrangements for squaring rotor shaft ball bearings.

Various other features of the present invention will become obvious to one skilled in the art upon reading the disclosure set forth herein.

SUMMARY OF THE INVENTION

More particularly the present invention provides an electric motor comprising a stator assembly including a stator core assembled from a stack of core laminations, the stator core having a central bore extending longitudinally therethrough and a plurality of core holes in the core surrounding the bore with core hole openings thereof along the end faces of the stator core; a rotor assembly including a rotor body centered within the bore, the rotor body having a rotor shaft extending endwise therefrom; bearing support end shield means having bearing supports for reception and journalling of the rotor shaft to rotatably support the rotor assembly within the central bore of the stator core, the bearing support end shield means including a plurality of bearing support end shield openings therein in register with the core hole openings; a plurality of fasteners extending through the registered bearing support end shield means openings and core hole openings into the core holes to tightly draw the bearing support end shield means into firm engagement with the stator core; and lamination joining means arranged to firmly grip and hold together the stack of laminations of the stator core, the lamination joining means being preselected to provide resistance to the bending moment along a preselected distance in the laminations created by the tightening of the plurality of fasteners to be less than the resistance to the bending moment along a distance in the bearing support end shield means whereby the bearing supports in the bearing support end shield means are maintained in squared, stable position relative the rotor shaft with any bending created by fastener tightening forces occurring among the stack of laminations of the stator core rather than the bearing supports in the bearing support end shield means to insure assembled stability of the bearing support end shield means and bearing supports. Further, the present invention provides in a method of assembling an electric motor having a stator assembly including a core made up of a stack of laminations of suitable magnetic material, the core having joining means to firmly grip and hold together the stack of laminations, a central bore extending therethrough, a rotor assembly including a rotor body adapted to be rotatably received in the bore and a rotor shaft extending endwise from the rotor body, and at least one bearing support end shield, the bearing support end shield having a bearing support to receive and journal the rotor shaft, the steps comprising: forming holes in the core and the bearing support end shield in register with each other; inserting the rotor assembly into the stator assembly with the rotor being received in the bore; centering the rotor body within the bore with an air gap between body and core of substantially uniform thickness therearound; installing the bearing support end shield on the stator and rotor assemblies with the rotor shaft journalled in the bearing support and the bearing support end shield bearing against an adjacent lamination of the core with registered core and bearing support end shield holes aligned; inserting fasteners through the aligned holes to be tightened to draw the bearing support end shield into firm gripping engagement with the core; the joining means for the core laminations being preselected so that resistance to bending moment created along a preselected distance of the laminations when the fasteners are tightened is less than the resistance to the bending moment created along a distance on the bearing support end shield between the fastener and the bearing support on the end shield to maintain the bearing support of the bearing support end shield in stable, squared position with any bending moment created by fastener tightening occurring among the stack of laminations of the core rather than the bearing support end shield and bearing support. In addition, the present invention employs, in combination with the aforegoing, a self-tapping screw arrangement with the holes in the bearing support end shield being sized to accommodate a portion of the material from outward core laminations during fastener tightening to further squarely secure the bearing support end shield in place with respect to the core and also employs the use of shims in the centering of the rotor body in the stator core.

It is to be understood that various changes can be made by one skilled in the art in one or more of the several parts of the electric motor apparatus disclosed herein and in one or more of the several steps of the disclosed method without departing from the scope or spirit of the present invention. For example, joining of stator core laminations can be accomplished in other ways besides with the joining cleats disclosed, the stator core and bearing support end shield structure can be varied mechanically and geometrically, as can the relative thickness and materials of the stator core laminations and bearing support end shields - care being taken to control the relative resistance to bending moment between these several parts to fall within the inventive scope of this disclosure.

BRIEF DESCRIPTION OF THE DRAWINGS

Referring to the drawings which disclose one advantageous embodiment of the invention.

DETAILED DESCRIPTION OF THE DRAWINGS

Figure 1:
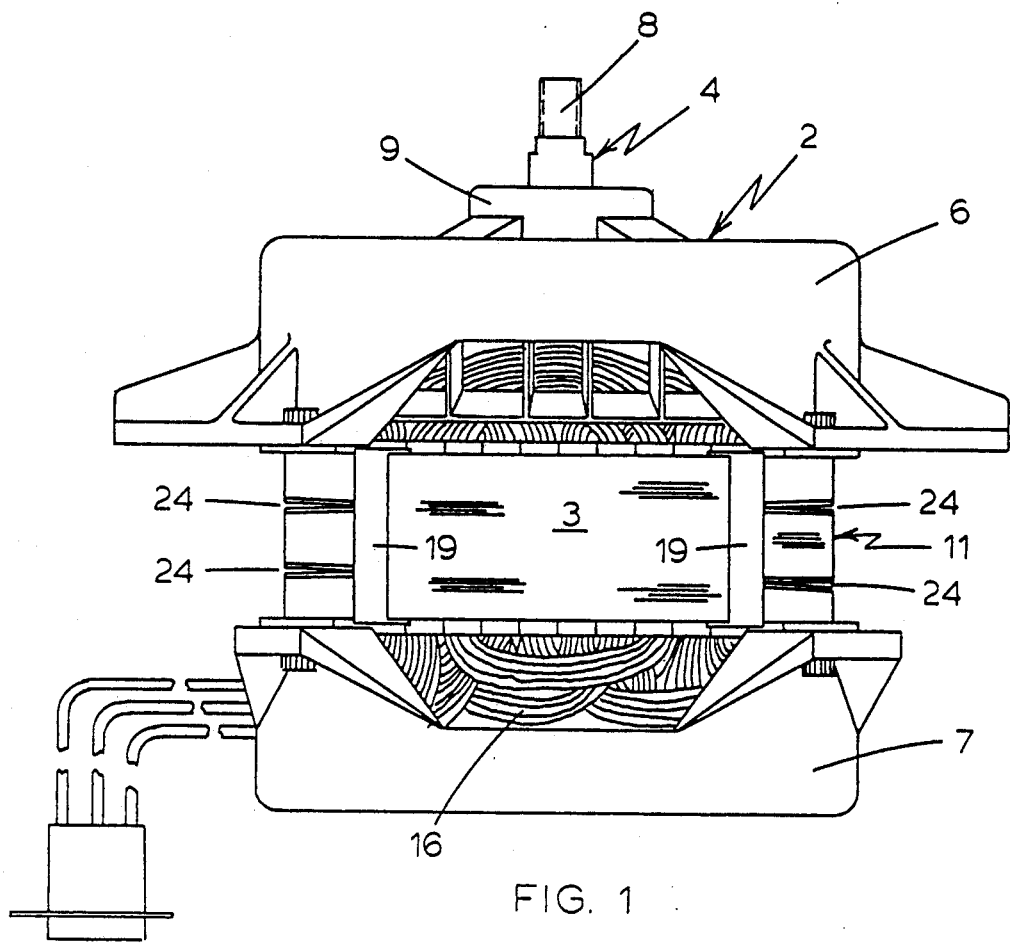
FIG. 1 is a side view of an electric motor structure including a stator core assembly and a bearing support end shield means incorporating the inventive features and disclosing in somewhat exaggerated form the effects of the controlled resistance to bending moment of the several parts.
Figure 2:
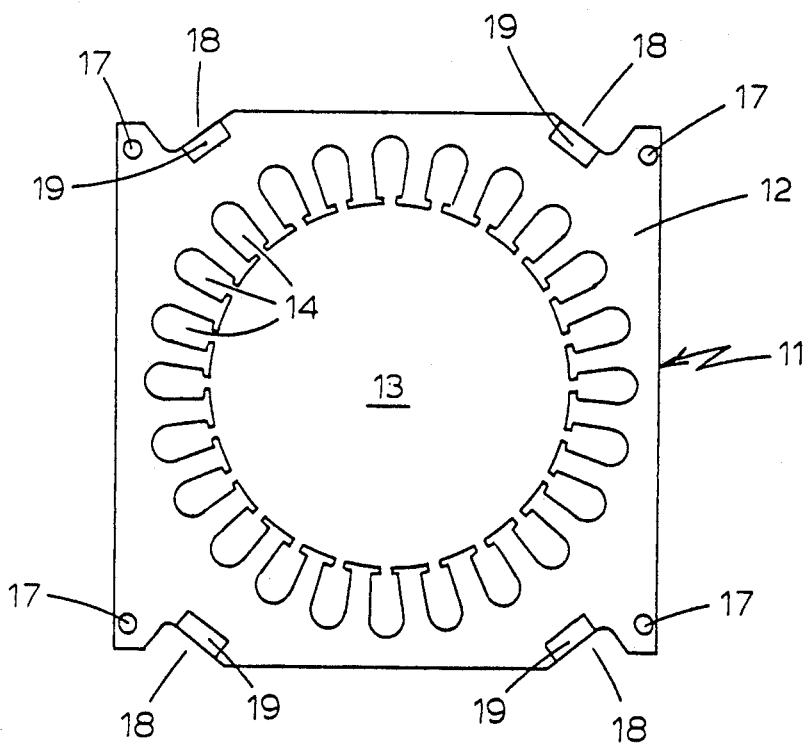
FIG. 2 is a top plan view or one of two opposed end faces of the stacked assembly of stator core laminations, disclosing the relative positioning of stator core holes and notched core laminations.
Figure 3:
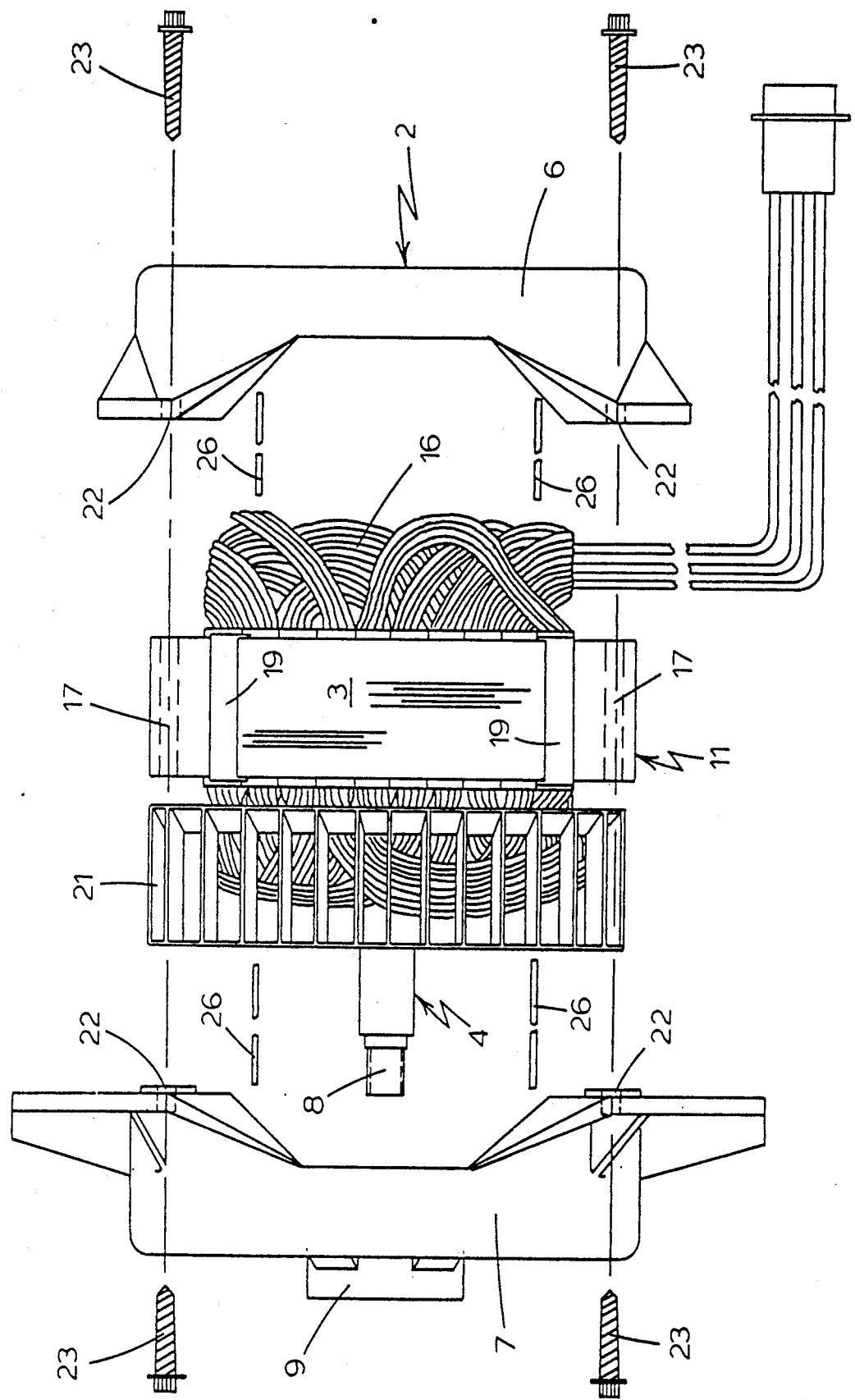
FIG. 3 is an exploded side view of the several parts of the motor of FIG. 1, further disclosing in broken line form shims used in the assembly thereof the position of the rotor relative the stator core and the pillow block and bearing in each end shield . . . ; and, FIG. 4 is a view similar to that of FIG. 1, also disclosing in somewhat exaggerated form the possible effects of uncontrolled resistance to bending moment of the several parts.
Figure 4:
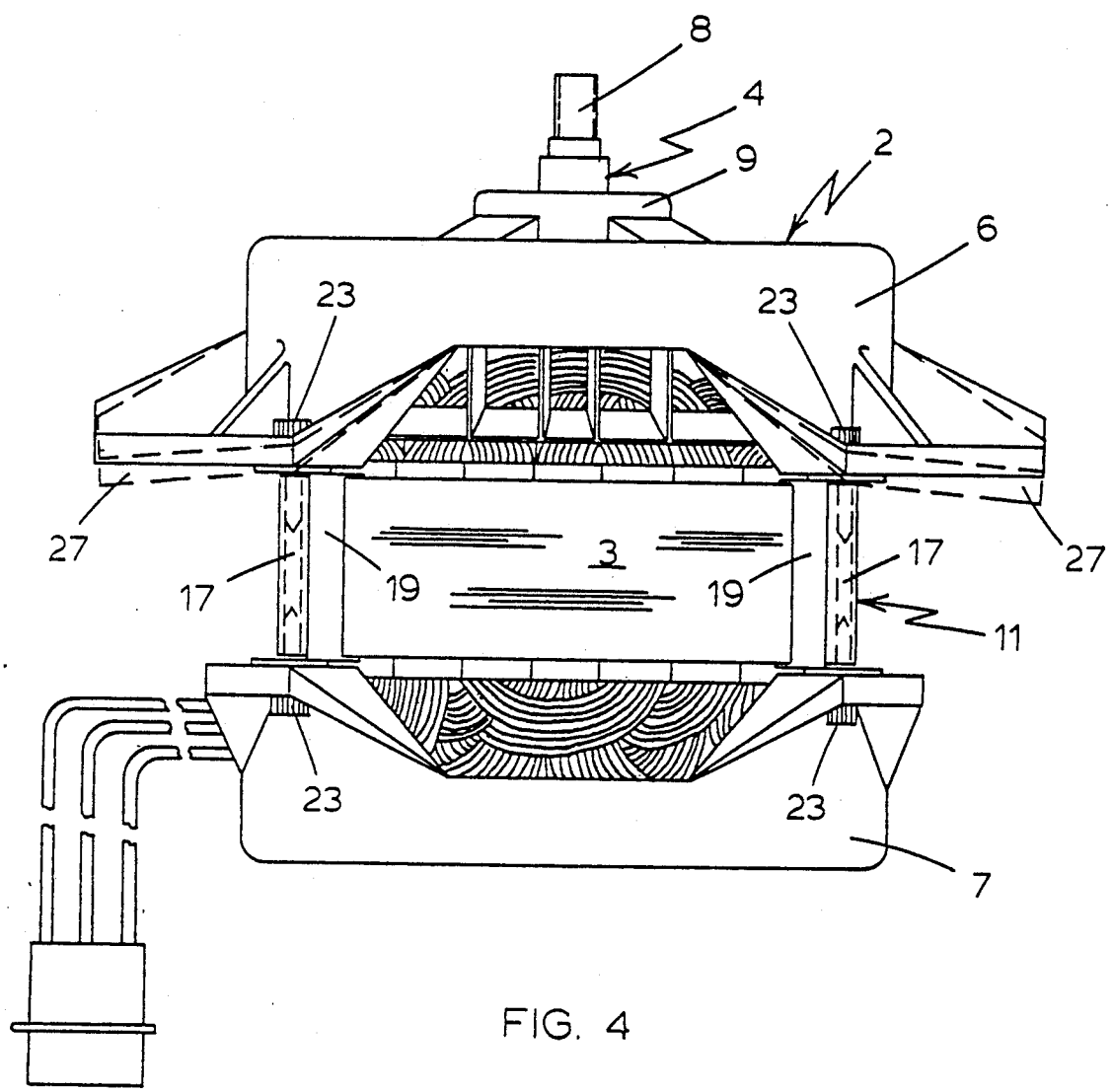

Referring to FIGS. 1, 3 and 4 of the drawings, there is disclosed a dynamo-electric machine in the form of a fractional horsepower electric motor 2. Motor 2 includes a stator assembly 3, a rotor body assembly 4 and a pair of opposed bearing support end shields 6 and 7 secured to the stator assembly 3 for journalling the rotor shaft 8 or rotor assembly 4 into bearing supports 9 on opposed end shields 6 and 7. Each bearing support 9 includes a pillow block 10 for an anti-friction bearing 10' sized to receive a corresponding end of rotor shaft 8. Motor 2 may be any conventional electric motor or other dynamo-electric machine. The stator assembly 3 is composed of a stator core 11 made up of a plurality of similar laminations 12 arranged in a stack (FIG. 2). Each lamination 12 advantageously is a stamped or punched plate-like member having a central opening to provide bore 13. A plurality of winding slots 14 (FIG. 2) extends radially outward from bore 13 to receive and retain stator windings 16 of stator assembly 3. The laminations are made of a suitable magnetic material, advantageously of sheet steel or other suitable ferro-magnetic material. The laminations 12, which can be stamped in any one of a number of geometric configurations, advantageously are disclosed as a rectangular square in the present form of the invention.

As can be seen in FIG. 2 of the drawings, each lamination 12 is provided with holes at the corners which when aligned upon stacking to form stator core 11 serve to form core holes 17 extending through the stator core 11 with openings along opposite end faces of the core. In accordance with the advantageous embodiment of the present invention disclosed, each lamination 12 is notched along the periphery a preselected distance from each hole formed therein so that cleat notches 18 are formed in the peripheral sides of stator core 11 when the laminations 12 are stacked to form stator core 1, each of these cleat notches 18 being a preselected distance from a core hole 17 for reasons described hereinafter. As disclosed, each cleat notch 18 is of right angular contour of a size sufficient to accommodate a U-shaped joiner cleat 19 with its base leg extending longitudinally along the side face of the stack of laminations forming a stator core 11 with the longitudinal axis thereof preselectively spaced from and parallel the longitudinal axis of an adjacent core hole 17. The spaced opposite side or end legs of each joiner cleat 19 grip the opposed outside laminations at the opposed end faces of stator core 11 and the stack of laminations therebetween to firmly secure together the stacked laminations of the stator core 11. It is to be understood that the present invention is not to be considered as limited to the specific joiner cleat disclosed but that other types of lamination joining arrangements can be employed to accomplish the purposes of the invention. As known in the electric motor art, rotor assembly 4, which includes a rotor body (not shown in detail) is centered within bore 13 of stator core 11, the rotor assembly 4 further including central rotor shaft 8 extending therefrom which has mounted thereon radial bladed motor fan 21 (FIGS. 1 and 3), which fan 21 can include, as known in the art, a central hub portion (not shown) which can be appropriately press fitted or splined to shaft 8.

Referring to FIG. 3 of the drawings, it can be seen that bearing support end shields 6 and 7, abovenoted as being secured to stator assembly 3 for journalling and supporting the rotor shaft 8 of rotor assembly 4 into bearing supports 9, includes a plurality of bearing support end shield openings 22 in each bearing support end shield at the corners thereof positioned to be in register with the openings of core holes 17 in stator assembly 3. As disclosed in detail in FIG. 4 of each of the aforenoted U.S. Pat. Nos. 4,306,168 and No. 4,361,953 and therefore not disclosed in the drawings, these bearings support end shield openings 22 are larger than the registered openings of core holes 17, being of sufficient size so that at least the outermost core lamination adjacent a core hole opening of a core hole 17 protrudes into the registered bearing support end shield opening 22 when the core lamination is bent into such opening by tightening of the fasteners inserted through the registered openings into a core hole 17. In this regard, in a similar manner as also disclosed in and described in detail at column 6 each of the above U.S. Pat. Nos. 4,306,168 and No. 4,361,953, a plurality of threaded self-tapping fasteners 23 is utilized to extend through registered support openings 22 and the openings of core holes 17 to be tightened in the core holes. Pursuant to the advantageous embodiment of the present invention as disclosed, the aforenoted preselected distance from a self-tapping fastener 23 and the longitudinal axis of the base leg of a U-shaped joining cleat 19 is such that the resistance to the bending moment created by the force tightening of self-tapping screw 23 is less than the resistance to the bending moment created along a distance on an adjacent bearing support end shield between self-tapping fastener screw 23 and a bearing support 9 on the bearing support end shield. As a consequence of this difference of resistance to bending moment, the bearing supports on bearing support end shields 6 and 7 are maintained in squared position relative rotor shaft 8 with any bending created by the tightening forces of self-tapping screws 23 occurring among stacked laminations 12 of rotor assembly 3, as disclosed in exaggerated form by reference numeral 24 in FIG. 1, rather than the bearing supports of bearing support end shields to assure assembly stability of such bearing supports in their bearing support end shields.

Again referring to FIG. 3 of the drawings, in carrying out the several steps of the inventive method of assembling the several parts of the novel electric motor described herein, the laminations 12 of suitable magnetic material are each stamped or punched as square rectangles to include a large central opening with radially extending, winding slots, four corner openings and four peripheral notches, each spaced a preselected distance from an adjacent corner opening. The laminations 12 are then stacked to form stator assembly 3 including a stator core having a central bore 13, four corner core holes 17 with four joining cleat peripheral notches 18, each notch 18 being preselectively spaced from its adjacent core hole 17. U-shaped lamination joining cleats 19 are then inserted into cleat notches 18 with the base legs of the cleats 19 extending along the side wall of the stator core assembly 3 and the side legs of cleats 19 gripping laminations 12 therebetween. Once stator windings 16 are wound in winding slots 14 of stator core 11 (FIG. 2) in a manner known in the art, the rotor body of rotor assembly 4 is centered in central bore 13 of stator core 11 (FIG. 2) of 3 (FIG. 3) by installing shims 26 (shown in broken lines in FIG. 3) between the rotor body and the inner wall of the stator core defining central bore 13. With this accomplished, the bearing support end shields 6 and 7 are assembled on opposed faces of the stator core 11 of the stator assembly 4 with bearing supports 9 receiving and journalling the rotor shaft 8 extending from opposed faces of the rotor body of rotor assembly 4 and with bearing support end shield openings or holes 22 larger than and registering with core holes 17.

Self-tapping fastener screws 23 are then inserted into the registered openings 22 and core holes 17 and tightened to a preselected torque. Referring to FIG. 1 of the drawings, since the preselected distances between adjacent screws 23 and lamination joining cleats 19 are such that resistance to the bending moment created along each of the preselected distances between screw and cleat when the screw is tightened is less than the resistance to the bending moment created along a distance on the associated bearing support end shield between the screw and the bearing support, the bearing support end shield and bearing support thereon are maintained in stable square position as can be seen in FIG. 1. As also can be seen in FIG. 1 in exaggerated form as designated by reference numeral 24, any bending moment created by the torquing forces of tightened screws 23 occurs among the stack of laminations 12 of stator core 11. As the laminations bend in accordance with the novel relative resistance to bending moment forces in the inventive structure described, the portion of the material from outward laminations of the core is accommodated by the large registered bearing support end shield holes 22 to further squarely secure the bearing support end shields in place with respect to the stator core. At this juncture in the method, shims 26 are then removed from the space between the inner wall of the stator core and the rotor body.

Referring to FIG. 4 of the drawings, an undesirable condition is disclosed by the exaggerated dotted lines indicated by reference numeral 27, such condition involving the possible bending of the bearing support end shield because of the changed close spacing of cleats 19 relative core holes 17 and self-tapping screws 23 so that the resistance to bending moment has been reversed - namely that of the bearing support end shield is less than the joined laminations with the tightening torque causing the end shield to bend rather than the limitations. Such a situation results in lack of motor squareness, concomitant bearing support squareness and alignment and possible binding of the several parts upon operation.

The invention claimed is:

1. In a method of assembling an electric motor having a stator assembly including a stator core made up of a stack of core laminations of suitable magnetic material, said stator core having joining means to firmly grip and hold together said stack of core laminations, a central bore extending therethrough, a rotor assembly including a rotor body rotatably received in said bore and a rotor shaft extending endwise from said rotor body, and at least one bearing support end shield, said end shield having a rotor bearing support to receive and journal said rotor shaft, the steps comprising:

selectively forming spaced apart holes in said stator core and said bearing support end shield so that said holes formed in said stator core and said holes formed in said bearing support end shield can be brought into aligned register with each other;

inserting said rotor assembly into said stator core assembly with said rotor body being received in said bore;

centering said rotor body within said bore, thereby creating an air gap having a substantially uniform between said rotor body and said stator core;

installing said bearing support end shield on said stator assembly and on said rotor assembly thereby journalling said rotor shaft in said bearing support and bearing said bearing support end shield against an adjacent lamination of said core with said selectively spaced core holes and said bearing support end shield holes in alignment;

inserting fasteners through said aligned core and bearing support holes and tightening said fasteners thereby drawing said end shield into firm gripping engagement with said core, said joining means for said stator core laminations being preselected distances in spaced position relative said fasteners and said rotor bearing support and thereby creating a resistance to the bending moment along said preselected distance of said core laminations and said fasteners less than the resistance to the bending moment created along said bearing support end shield between said fasteners and said rotor bearing support thereby maintaining said bearing support end shield and rotor bearing support in a stable, squared position with any bending created by fastener tightening occurring among the stack of core laminations of said core assembly rather than said bearing support end shield and rotor bearing support.

2. In the method of assembling an electric motor of claim 1 wherein the step of forming holes in said bearing support end shield comprising sizing said holes thereby accommodating a portion of the material from the outward laminations of said core during fastener tightening thereby further squarely securing said bearing support end shield in place with respect to said core.

3. In the method of assembling an electric motor of claim 1 wherein said step of centering said rotor body is accomplished by installing shims between said rotor body and the inner wall of said core defining said central bore during assembly and wherein said method further includes removing said shims after said fasteners have been tightened.

4. In the method of assembling an electric motor of claim 1 wherein self-tapping screws are used as fasteners.

5. In the method of assembling an electric motor of claim 1 further comprising stamping each of said laminations in rectangular shape prior to assembly to include said core holes adjacent the corners thereof with the peripheral edges notched preselected distances from said core holes to receive said joining means in the form of U-shaped cleats, subsequently said laminations in alignment thereby forming said core and further installing said U-shaped cleats in said notches thereby firmly gripping said stator core together.

6. In the method of assembling an electric motor of claim 1 further comprising stamping each of said laminations in substantially square shape.

7. In a method of assembling an electric motor having a stator assembly including a stator core made up of a stack of core laminations of suitable magnetic material, said stator core having a plurality of laminations joined together and surrounding a central bore extending therethrough, a rotor assembly including a rotor body rotatably received in said bore and a rotor shaft extending endwise from opposed faces of said rotor body and with opposed bearing support end shields, each having a rotor bearing support to receive and journal said rotor shaft, the steps comprising:

stamping a preselected plurality of similar, square-shaped core laminations or suitable magnetic material, each of said including a central bore, core holes adjacent the corners thereof and peripheral notches, each spaced a preselected distance from a core hole to receive the base leg of a U-shaped lamination joining cleat which cleat includes a base leg and two side legs extending from opposite extremities thereof;

stacking said core laminations in alignment thereby forming said stator core with aligned core holes and peripheral notches and inserting said U-shaped joining cleats in said peripheral notches with said side legs of said joining cleats gripping said core laminations therebetween;

centering said rotor body in said central core by installing shims between said rotor body and the inner wall of said stator core defining said central bore;

assembling said bearing support end shields on opposed faces of said stator core with said opposed bearing supports receiving and journalling said rotor shaft extending from opposed faces of said rotor body, said bearing support end shields having holes therein larger than and registering in alignment with said core holes;

inserting self-tapping screw fasteners into said registered and aligned bearing support end shield holes and said core holes and tightening the same to a preselected torque, said preselected distances between adjacent fastener screws and said core lamination joining cleats being such that resistance to the bending moment created along each of said preselected distances between fastening screw and joining cleat when said self-tapping screw is tightened is less than the resistance to the bending moment created along a distance on said bearing support end shield between said self-tapping screw and said rotor bearing support on said bearing support end shield thereby maintaining said bearing support end shields and rotor bearing supports in a stable, squared position thereby accommodating any bending moment created by the torquing forces occurring among the stack of core laminations of said core and within a portion of the material from outward laminations of said core by said larger holes of said aligned and registered bearing support end shields and further squarely securing said bearing support end shields in place with respect to said core; and, removing said shims between said core and said rotor.

* * * * *